No. 730,496. PATENTED JUNE 9, 1903.
G. T. VOORHEES.
OIL SEPARATOR FOR REFRIGERATING MACHINES.
APPLICATION FILED AUG. 30, 1901.
NO MODEL.
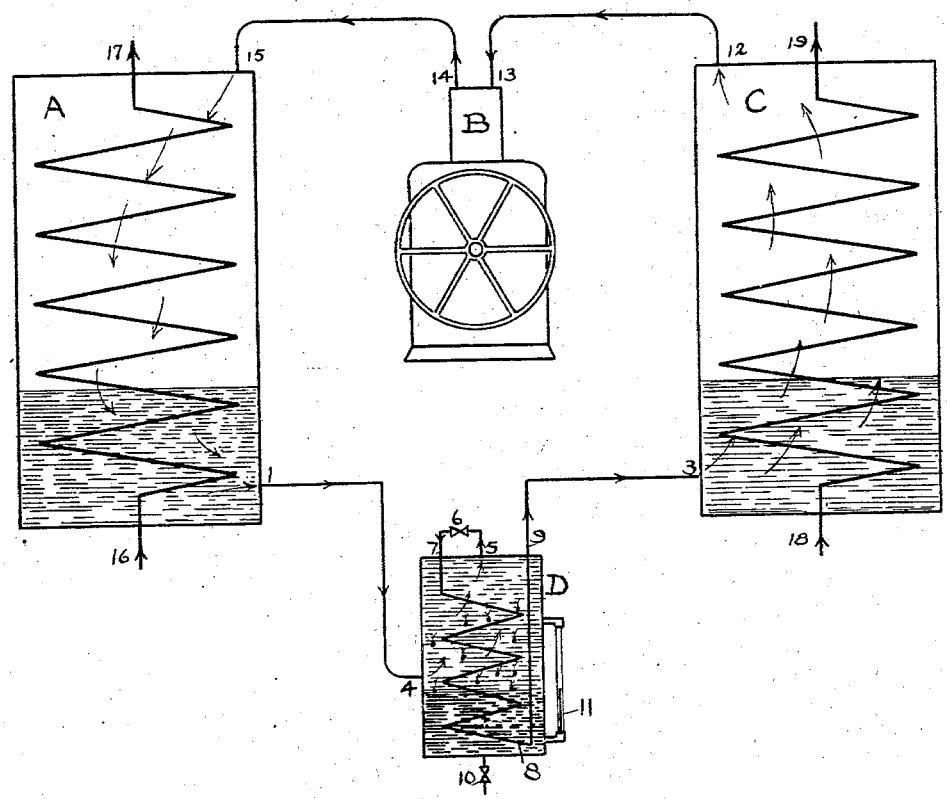
WITNESSES
E. A. Allen
Charles F. Richards
INVENTOR
Gardner T. Voorhees No. 730,496. Patented June 9, 1903.

UNITED STATES PATENT OFFICE.

GARDNER T. VOORHEES, OF BOSTON, MASSACHUSETTS.

OIL-SEPARATOR FOR REFRIGERATING-MACHINES.

SPECIFICATION forming part of Letters Patent No. 730,496, dated June 9, 1903.

Application filed August 30, 1901. Serial No. 73,815. (No model.)

*To all whom it may concern:*

Be it known that I, GARDNER T. VOORHEES, a citizen of the United States, residing at Boston, in the county of Suffolk and State of Massachusetts, have invented certain new and useful Improvements in Oil-Separators for Refrigerating-Machines, of which the following is a specification, reference being had therein to the accompanying drawing.

The figure is a diagrammatic view of my invention embodied in a refrigerating-machine.

It is well known that in compression-machine systems of refrigeration the presence of oil in liquid anhydrous ammonia causes much of the poor work of expansion-coils and brine-coolers, the reason being that large quantities of oil get into the expansion-coils or the ammonia-space of the brine-cooler and prevent the proper transfer of heat to the ammonia from the pipe and occupy much of the space that should be devoted to the liquid ammonia. This latter space being partly filled with oil having bubbles or slugs of liquid ammonia and gas passing through it, only a small part of the cooling value of the pipe-surfaces is realized.

The oil-separator at present used separates the oil only in part, because the oil is finely divided and is in a partially-vaporized state in the liquid ammonia. Now by cooling the liquid ammonia before it passes the expansion-valve I find that these finely-divided particles of oil unite and the oil-vapor is condensed, the oil separating from the liquid ammonia.

The object of my invention is to provide means whereby the above separation can be accomplished.

In the drawing illustrating the principle of my invention and the best mode now known to me of applying that principle, A is a condenser; B, a compressor; C, a cooler; and D the preferred form of my oil-separator. The separator D is in communication with the condenser A by the pipe 1 4 and with the cooler by the pipe 5 7 8 9 3. The pipe 1 4 may be of any desired length. A pipe leading away from the separator at 5 has an expansion-valve 6 and then returns and enters the separator. Here it is provided with coils 7 8 and then leaves the separator at 9 and enters the cooler C at 3. The separator has a gage-glass 11 at one side and an outlet at its bottom through a pipe and a valve 10. The compressor B communicates with the cooler C by pipe 12 13 and with the condenser A by pipe 14 15.

The operation of my invention is as follows: The compressor B forces ammonia vapor and oil through the pipe 14 15 into the condenser A, and hence by means of the cooling-coil 16 17 condensation takes place. The contents of the condenser then flow out therefrom through the pipe 1 4 and into the separator D. The flow area of the separator being larger than that of the pipe 1 4, the velocity of the liquid in its flow upward over the outer surface of the coil 7 8 and to the expansion-valve 6 is much reduced. As the ammonia that has passed the expansion-valve expands it causes the greatest possible cold in the coils 7 8, and thus subjects the contents of the separator to its corresponding temperature. This intense cold causes the oil to separate from the liquid ammonia and form globules, as shown in the drawing. Oil being heavier than liquid ammonia, these globules settle to the bottom of the separator. The gage-glass 11 indicates the amount of oil collected, and when desired the oil can be drawn away from the separator by the valve 10. The liquid ammonia in the upper portion of the separator is now free of oil. From the separator the liquid anhydrous ammonia passes out through the pipe 5, through the expansion-valve 6, expands and continues through the coil 7 8 9, and enters the cooler C at 3. The ammonia now free of oil vaporizes in the cooler and absorbs heat from the brine in the brine-coil 18 19. It then enters the compressor through the pipe 12 13, and the cycle is completed.

I wish to be understood as claiming my invention in the broadest manner legally possible, the term "cooler" meaning any device whereby a cooling effect is realized by the use of a refrigerent agent.

What I claim is—

1. A compressor; a cooler; a condenser; an oil-separator; a pipe communicating between said compressor and said cooler; a pipe communicating between said compressor and said condenser; a pipe leading from said condenser to said separator; a pipe leading from the upper portion of said separator to said cooler;

and an expansion-valve in said latter pipe; said separator consisting of a closed receptacle, a portion of said pipe, between the expansion-valve and the cooler, being coiled within said receptacle, and means whereby oil may be withdrawn from said receptacle.

2. An oil-separator, for a refrigerating-machine, made up of a closed receptacle; an inlet; an outlet; a pipe leading from the upper portion of said receptacle; an expansion-valve in said pipe; a portion of said latter pipe, between the expansion-valve and its free end, being coiled within said receptacle; means whereby oil may be withdrawn from said receptacle.

In testimony whereof I affix my signature in presence of two witnesses.

GARDNER T. VOORHEES.

Witnesses:
E. A. ALLEN,
CHARLES F. RICHARDSON.